Dec. 6, 1938.  T. T. TOWNSEND  2,139,476
AUTOMATIC BATTERY FILLING DEVICE
Filed March 30, 1937  2 Sheets-Sheet 1
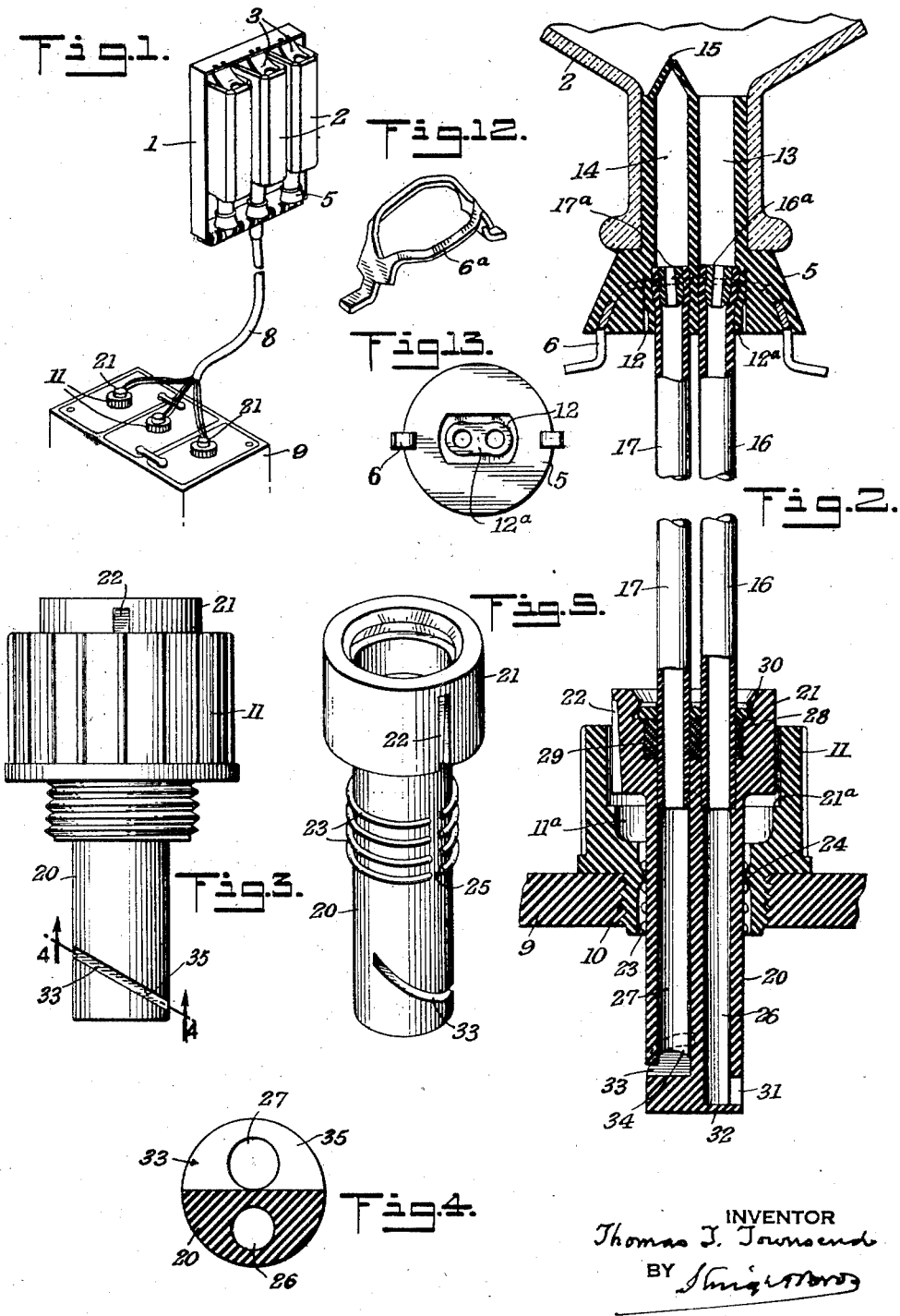
INVENTOR
Thomas T. Townsend
BY
ATTORNEYS Dec. 6, 1938.  T. T. TOWNSEND  2,139,476
AUTOMATIC BATTERY FILLING DEVICE
Filed March 30, 1937  2 Sheets-Sheet 2
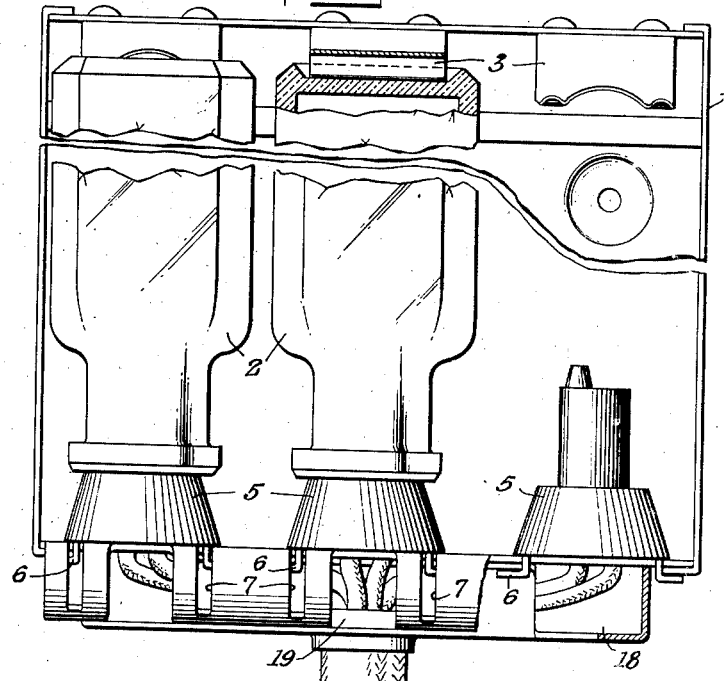
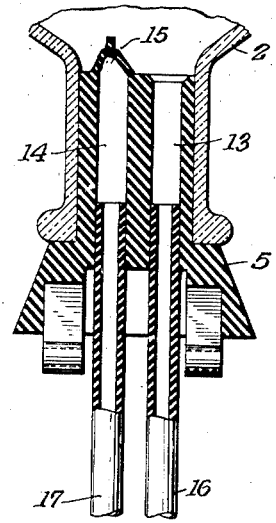
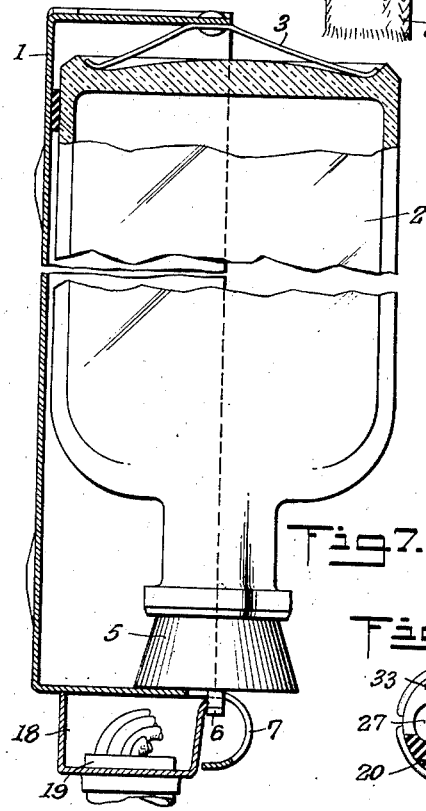
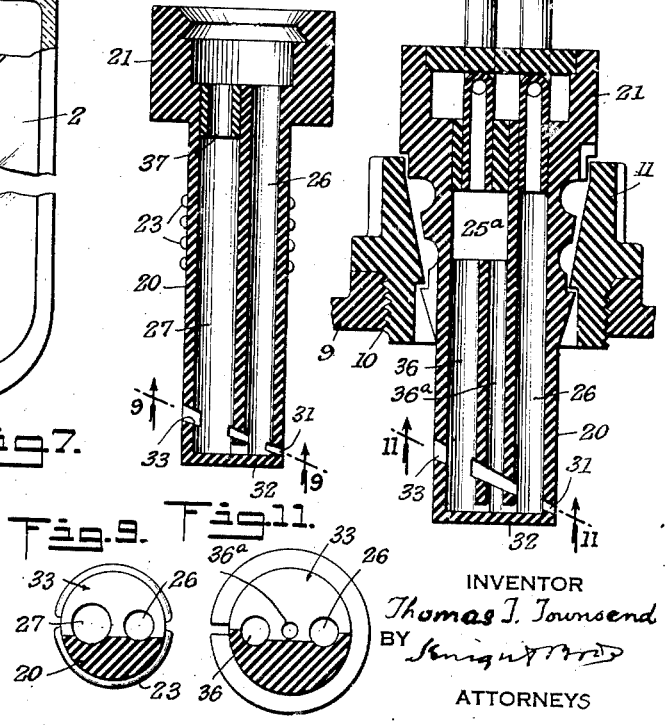
INVENTOR
Thomas T. Townsend
BY
ATTORNEYS Patented Dec. 6, 1938

2,139,476

UNITED STATES PATENT OFFICE 2,139,476

AUTOMATIC BATTERY FILLING DEVICE

Thomas T. Townsend, New York, N. Y.

Application March 30, 1937, Serial No. 133,751

10 Claims. (Cl. 137—68)

This application is a continuation in part of my application, Serial No. 13,998, filed April 1, 1935.

The present invention relates to improvements in automatic battery filling devices for maintaining the level of the electrolyte in a storage battery cell within certain high and low limits of variation. The apparatus is designed to act automatically under the control of the level of the electrolyte to add a sufficient quantity of liquid when the surface of the electrolyte is low in the battery to raise the level of the electrolyte therein to its high or normal point, and then automatically arrest the operation. The construction and principle of operation are such as to restore the liquid level in the battery without danger of flooding, which has been a serious difficulty in prior devices of this character.

The invention is applicable to stationary batteries, but is peculiarly effective for use with batteries supported on moving vehicles in which, owing to the trembling and swaying of the vehicle and its departures from level generally, the electrolyte in the battery is subjected to constant alterations, local or general, in level. The present construction is adapted to take advantage of such fluctuations in level of the fluid to promote instead of impair effective operation and to prevent an over-supply of fluid to the battery.

The battery to which the invention is applied may be made up of one or a plurality of cells. Usually the battery of an automobile has three cells and each cell is supplied with replenishing liquid from an independent reservoir connected by conduits to its corresponding cell, each reservoir and cell with their connecting conduits being a distinct system, although the several supply tubes may be bound together for protection and convenience in a single protecting envelope in that part of their length lying between the reservoirs and the battery.

In carrying out the purposes of the present invention, each storage battery cell is connected with an independent water supply reservoir through two independent conduits, one being a water supply tube leading from the reservoir to the battery cell and the other being an air aspirating tube leading from the battery cell to the reservoir. These independent tubes connect respectively with a water supply passageway and an air inlet passageway in the body of a control member that is supported upon the closure cap in the filling opening of the battery cell and projects into the cell with its lower end submerged in the electrolyte above the plates. The air inlet passageway and the water supply passageway are formed with laterally opening ports at different levels in the control member, the port of the water supply passageway being just above the bottom wall of the control member and intended to be permanently submerged in the electrolyte, while the port of the air inlet passageway is on the opposite side of such member and at a slightly higher level to determine the minimum level of the electrolyte and, in the construction which is specifically the subject of the present application, opens into a slot which is at an angle to the longitudinal axis of the control member, and which may be so disposed with relation to such axis that no line parallel to the plane of the slot is normal to such axis. The upper ends of each pair of water supply and air inlet tubes leading from the control member are attached to a channeled soft rubber stopper removably mounted in the mouth of an inverted bottle, one of which constitutes the water supply reservoir for each battery cell. The inner end of the air inlet channel in the supply reservoir stopper is arranged with a check valve, or has a diminished passage to act approximately like a check valve, in permitting the upward flow of air from the vent tube while obstructing the downward flow of liquid into that tube.

The flooding of the battery which has occurred with some prior devices has principally been due to the disturbance of the static conditions in the system by the dynamic action of the surging electrolyte in the battery cells of a moving automobile. My copending application, Serial No. 133,752, describes a means of controlling these dynamic forces by baffling. The present application covers another means of preventing the static conditions within the system from being interfered with by the surging of the electrolyte, namely, by the utilization of relatively large capillary surfaces at the port or ports entering the air passageway.

In order that the invention may be fully understood, it will first be described with reference to the accompanying drawings, and the novelty will afterwards be pointed out in the annexed claims. In said drawings—

Figure 1 is a small perspective view illustrating a storage battery of three cells communicating through three pairs of tubes with three water supply reservoirs in the form of inverted bottles removably mounted in a supporting box or case by any suitable means.

Figure 2 is an enlarged detail sectional view showing the essential parts of one of the reservoir bottles with removable stopper and connected through water supply and air tubes with the control member removably mounted in the filling openings of a battery cell.

Figure 3 is a detail side elevation illustrating the preferred form of the automatic control member and the means of mounting it in the battery cell.

Figure 4 is a cross sectional view of the control member taken on the line 4—4 of Figure 3.

Figure 5 is a detail perspective view of the control member of preferred form.

Figure 6 is an elevation, parts removed, and others shown in section, of the reservoirs and their supporting case.

Figure 7 is a sectional elevation taken in a plane normal to that illustration in Figure 6.

Figure 8 is an axial or vertical sectional view of a modified form of control member.

Figure 9 is a horizontal sectional view of the same, the plane of section being indicated by the line 9—9 of Figure 8, and the line of sight, as indicated by the arrows, parallel to the axis of the control member.

Figure 10 is a view similar to Figure 2 illustrating other modifications.

Figure 11 is a view like Figure 9 of the form shown in Figure 10, as indicated by line 11—11, on Figure 10.

Figure 12 is a detail view of the metal ring forming part of the bottle hinge, and Figure 13 is a view of the outside face of the reservoir stopper.

Referring to Figures 1, 6 and 7 of the drawings, it will be observed that any suitable rack or case indicated at 1 supports three inverted bottle reservoirs 2 which are removably retained in the rack 1 by any suitable means such for instance as the spring fingers or clips indicated at 3. Each of the bottle reservoirs 2 is provided with a removable soft rubber stopper 5 having means, such as indicated at 6, in the form of metal arms which engage in eyes 7 formed by curving the base of rack 1, which retain the arms from accidental dislodgment and allow them to swing at the bottom in a manner to enable the reservoirs to be individually moved forward on the hinge members 6 and 7 as an axis, to disengage the bottle from the spring clips 3 and enable the operator to free the bottle from the stopper 5 and replenish the water therein, after which the bottle is again closed by engagement of its stopper and returned to its inverted vertical position as shown.

Two independent flexible tubes communicate with each of the stoppers 5, as hereinafter more specifically described, and the three pairs of tubes from the stoppers of the three bottle reservoirs are brought together and bound into a common cable indicated at 8 which passes downwardly to the storage battery with which the filling reservoirs are to cooperate.

9 indicates a storage battery of standard design having three cells with screw-threaded filling openings indicated at 10 (see Figures 2 and 10) normally closed by the screw caps 11, in which are freely mounted the control members hereinafter described. In Figure 1 the cable of flexible tubes is divided adjacent to the battery 9 into three separate pairs of tubes which communicate with passageways in the control members of the three battery cells in the manner hereinafter explained. With this arrangement it will be observed that each battery cell is in communication with one of the bottle reservoirs through two flexible tubes, one of the tubes being the water supply tube and the other the air inlet tube by which the operation of the automatic battery filler is controlled. It will be understood further that the structure of the automatic filling device is the same for each of the battery cells making up the storage battery so that a detailed explanation of the apparatus and its operation as applied to a single cell will make it clear that the described devices are duplicated for every battery cell forming part of the complete battery.

Referring to Figure 2 of the drawings it will be observed that the soft rubber stopper 5 is molded with a deep narrow slot 12 so as to present a flexible neck 12$^a$ approximately elliptical in cross-section, axially through which are extended the longitudinal water supply passageway 13 and the air inlet passageway 14. The passageway 13 opens freely into the bottle reservoir while the passageway 14 is preferably provided at its inner end with means to permit the passage of air from the passageway 14 into the bottle reservoir while obstructing the downward passage of water as by a check valve or by the provision of a small opening 15 at the peak of a teat with which the passageway 14 ends.

16 is a small bore flexible rubber tube having its upper end fitting snugly in and forming a continuation of the water supply passageway 13 of the stopper 5. 17 is a similar small bore flexible tube having its upper end snugly fitting in the air venting passageway 14 of the stopper 5. These tubes 16 and 17 pass from the three stoppers 5 through a channel casing 18 to a central coupling sleeve 19 where the three pairs of tubes are brought closely together and confined by any suitable tubular covering to form the flexible cable 8 of the cluster of tubes. Various improvements shown in the reservoir end of the system are not claimed herein and will be made the subject of separate applications.

It will of course be understood that the rack 1 supporting the inverted bottle reservoirs 2 is designed to be supported at a sufficient elevation above the storage battery that is to be served, to insure the water flowing from the reservoirs to the battery cells by gravity under control of the improved control members and supported in the filling openings of the battery cells. Figures 2 to 5 show the preferred form of the control member as consisting of a substantially cylindrical shaped body 20 of hard rubber or the like formed with suitable passageways, presently to be referred to, and with an enlarged recessed head 21 shouldered to rest upon a shoulder 21$^a$ of the hollowed out cap 11. This control member is formed with one or more venting grooves 22 in the head 21 which expand downwardly in a plane radial to the member so as to allow a vented way from the interior of the cap 11 to the outer air, permitting free passage of gases set free in the cell and keeping the interior of the cell at atmospheric pressure. The control member 20 is formed with a series (four are shown) of interrupted ribs 23 engaging a circular rounded rib 24 on the interior of the cap 11 adjacent to the control member. This construction enables the control member to be removed or to be adjusted in height for different batteries, which, in practice, vary as to the amount of space between the battery plates and the cell top. It is desirable to have the control member adjusted as low in the cell as is permitted by the height of the plates therein. The ribs 23 are broken away as shown in Figure 5 at 25 to complete the series of vents by which the interior of the cell is placed in communication with the atmosphere. The cap 11 is chambered at 11ª to provide, in association with the large vent passages, for the settling out of liquid entrained by the escaping gas.

The lower ends of tubes 16 and 17 are led to and seated closely within the upper ends of water passage 26 and air passage 27, the water passage being reduced in diameter below the end of tube 16. I have found $14/64$ and $11/64$ of an inch effective relative diameters of the passages below the tubes 16, 17. The lower ends of tubes 16, 17 are sealed at 28 where they pass through the recess 29 in the head 21 of the control member and a disk of semi-hard rubber may be pressed into engagement with the angularly ridged seat 30 of the control member to protect the joint.

The water supply passage 26 has an outlet port at 31 immediately above the bottom wall 32 of the control member, which wall is imperforate and approximately horizontal in the normal position of said member. In normal operation, the port 31 is permanently submerged. The passages 26 and 27 are not in communication and there is no possibility, therefore, that surging of the battery fluid through the control member will disturb the action of the apparatus. An inclined slot 33 is made in the lower part of the control member on the air passage side thereof, in which slot the air passage 27 ends at 34 as shown in Figure 2. The angle of inclination of the slot is preferably approximately that shown and the slot may be inclined as shown only with reference to one plane parallel to the axis of the control member or with reference also to a plane normal to the first plane. The surfaces of the slot and the edge of the inlet passage 34 lying in such inclined plane are elliptical, and opening 34, which forms the port to the air passage, is a single opening elongated in the plane of the slot, so that its ends are presented at different distances from the lower end of the control member and further away from said lower end than the water supply port. The air and liquid in the cell has access to the air passage 27 only through the slot 33. The lower end 34 of the passage 27 is placed at a height above the bottom of the control member determined by the margin of variation allowed for the liquid level in the cell. The width of the slot which may be $\frac{1}{16}$ inch or less and the area of the surfaces 35 of the slot around the passage 27 are such that the surface tension and capillary attraction will cause the liquid to act as a seal to the air inlet and so control the refilling operation as will be described. The width of the slot and the area of the surfaces thereof will therefore (other conditions remaining constant) be determined by the desired speed of water feeding—a narrower slot and/or increased area of the slot surfaces being adapted to slow up the action.

The air passage having only a single opening 34, there can be no surging of turbulent currents through the lower end of the control member and the tendency of such currents to flow past the inlet 34 is also resisted by the narrowness of the slot 33 and the area of surfaces 35.

The above-described apparatus has been found in practice to operate well in automatically replenishing the liquid in a battery cell as frequently as required by the dropping of the electrolyte level below the minimum at which the plates are covered to a safe depth, and without excessive supply of liquid from the reservoir such as to result in flooding the battery—with consequent subjection of the contiguous parts to corroding action. I present the following as a theory consistent with observations made of the apparatus in operation, without intending to imply that the invention is limited to the operation here described.

Normally the electrolyte fills the battery above the plates to a height somewhat above the upper edge of inlet 34 with a safe margin between the electrolyte level and the underside of battery top 9. Owing to the vented construction of the battery closure, the air within the battery is at atmospheric pressure. Gas evolved in the battery escapes between the control member and the closure cap through the vents 22, 25. There is no aperture into the control member to be entered by vertically rising gas bubbles evolved in the cell which might, by rising into the reservoir, cause false operation of the refilling apparatus—whose operation should be due only to the loss of electrolyte. With the reservoir properly charged with water to cover the upper ends of passages 13 and 14, the last refilling operation has left the whole system full of liquid up to the water level in the reservoir, with pressure in the reservoir below atmospheric to an extent measured by the height of the water column between the liquid levels in battery and reservoir.

As the electrolyte level in the battery lowers by reason of evaporation and battery activity, it reaches the upper edge of the slot 33 and thereafter the upper edge of the air inlet 34. Surface tension and capillary attraction cause the fluid filling the slot 33 to restrain the passage of air into inlet 34 until the level of liquid in the battery jar drops considerably below the upper edge of inlet 34 before the air can penetrate through the inlet. In control members used heretofore, the air inlet has been in the form of a small hole through a thin wall surrounding the air chamber. With this construction the surface tension at the air inlet apparently prevented liquid from passing out of the inlet at the same time an air bubble was trying to enter the inlet. It was therefore necessary to provide a second outlet for the liquid. The air tube leading to the reservoir could not serve as the second outlet because as soon as a bubble of air reached the bottom of the air tube a surface tension was set up across the bottom of the air tube which blocked passage of liquid up the tube. The presence of relatively large capillary surfaces around the inlet 34 of the control member here disclosed seems to assist the liquid to pass out of the inlet while an air bubble is pressing in at the top. The bottom of the slot 33 being submerged, there is no point at which surface tension is set up to interfere with the downward movement of the liquid in the slot 33, and the drag of gravity tending to pull the liquid down the sloping surface of the slot helps to draw a drop of water out of the air chamber to make room for the entering bubble of air.

If the automobile on which the apparatus is mounted is in motion, with resulting agitation of the surface of the liquid, the slot and inlet will be exposed to the air in the battery for brief and interrupted periods before the liquid level as a whole has lowered to that point. In either case, whether at rest or in motion, the pressure of the air and the pull of gravity upon the liquid which fills the slot will ultimately overcome the resistance due to surface tension and capillarity, resulting in the admission of a bubble of air to the air passage 27, the admission acting earlier, and in smaller quantities, and so tending to replenish the battery in smaller graded increments if the battery is in motion than is the case if the battery is at rest. When the surface tension is broken and the air begins to enter the inlet, the inclined surface of the slot tends to assist the drainage from the passageway. Thus this form of my device is independent of a separate water discharge port from the air passageway which has heretofore been used.

The result is a pulsating motion of the liquid in the slot, letting air into the air inlet in bubbles which pass up through the air passage preceded and followed by slugs of liquid. There may be a delay in the beginning of circulation upward in the air tube and downward in the water tube, due to surface tension set up across the mouth of the air tube 17 when an air bubble reaches that point. The circulation begins when a sufficient column of air accumulates in the air passageway 27 to unbalance the system enough to overcome the surface tension at the mouth of the tube 17. The circulation may accelerate when this initial body of air enters the tube 17 and becomes elongated, thus accentuating the unbalance of the system. But when this body of air has escaped into the reservoir, the air tube is left filled with bubbles of air separated by slugs of water. As the level of the electrolyte in the battery cell rises, the air bubbles in the tube 17 become fewer, until the unbalance of the system is no longer sufficient to overcome the surface tension at the mouth of tube 17. This stops the circulation until the level of the electrolyte drops enough to let in more air bubbles. The system is maintained so nearly at a balance, the passages are so small, and the unbalance when it occurs is so slight, that even the slight resistance of the surface tension affords an effective valve to graduate the flow. The battery cell is never flooded because the air is measured in small bubbles segregated by water and there is never a direct air communication between the reservoir and the outer atmosphere; also because the system is effectively shielded from the dynamic action of the swaying electrolyte in the battery cell. (The direction of flow in the air passage is upward and the resulting downward flow in the water passage to refill the cell takes place without sudden flooding.) The circulation maintained soon results in equal densities in battery and reservoir, with consequent lessening of chance of freezing the liquid in the reservoir and connecting tubes.

In the form of the invention shown in Figures 8 and 9, the water outlet 31 is placed as before at the foot of the water passage 26, the slot 33 cuts both air and water passages and the air and water passages communicate at their foot, while in the form shown in Figures 10 and 11 the air passage is branched as shown at 36, 36ª and both branches are open to the water passage at the foot. The form shown in Figure 10 has an air chamber 25ª with which the upper ends of both air branches 36 and 36ª communicate and has a function similar to that of the enlarged air passage of Figure 8 below the thimble 37. Both these forms of the invention may be said to combine the constructions and the functions of the device shown in Figure 2 of this specification with that shown in my copending application, Serial No. 133,752.

The tubes 16 and 17 in these forms of the invention, may, as shown, enter the head of the control member from the side or as shown in Figure 2, from the top.

The control member and the cap walls are near enough together to secure engagement of the engaging means, as for example, the ribs 23, 24, positively enough to hold these members from accidental relative axial movement, but the fit of the control member in the cap is loose enough to provide passageway for escaping gas while the entrained liquid will flow back through the venting grooves.

In the form of reservoir mounting, shown in Figures 2 and 12, the arms 6 project laterally from an elongated ring 6ª embedded in the head of the stopper so that only the arms project for engagement with the hinge eyes 7. The neck 12ª is divided from the body of the stopper head by the slot 12 nearly to the plane of the bottle rim. It is extended laterally to afford reception for the ends of both tubes 16 and 17 which have immediately within their upper ends hard rubber or similar hard rings 16ª, 17ª, so that when the rings are inserted in the tubes, the latter will be slightly expanded, and so, when inserted in the small passageways in collar 12ª, will expand the collar (which is free to expand into the space of slot 12), and be held securely by the contractile force of the collar.

I claim:—

1. A control member for an automatic battery filler adapted to be supported in a battery cell, formed with air and water passageways, communicating at their lower ends, the water passageways having a water supply port at its lower end, the air passageway having an air inlet port above the water supply port and the control member having an inclined narrow open slot communicating with both passageways.

2. A control member for an automatic battery filler adapted to be supported in a battery cell, formed with a water supply passageway having a discharge port at the lower end of the control member, a separate air passageway having an air chamber and branched below said air chamber, the several passageways communicating at the lower end of the control member, and having a single inclined open slot opening into all the passageways.

3. A battery filler plug comprising a hollowed out closure cap having an engaging ridge on its inner surface, and a battery filler control member having a series of vented ridges engaging at variable positions the ridge on the cap.

4. A battery filler plug comprising a hollowed out closure cap member and a battery filler control member inserted therein, one of said members having a plurality of resilient engaging elements, the other member having engaging means cooperating with said elements to hold said members in a selected one of several relative positions.

5. A control member for automatically controlling the flow of water from a reservoir to a battery cell, said member being adapted to be supported in a battery cell and formed with water supply and air inlet passageways, said member having a narrow slanting slot near its lower end intersecting said air inlet passageway and forming closely opposed lips extending in a direction transverse to the longitudinal axis of said control member for a distance considerably greater than the distance between the lips, one end of said slot extending above the intersection of said slot and said air passageway, said water supply passageway being opened to the space within the battery cell below said intersection.

6. A control member for automatically controlling the flow of water from a reservoir to a battery cell, said member being adapted to be supported in a battery cell and formed with water supply and air inlet passageways, said member having a narrow slanting slot near its lower end intersecting at least a large part of said air inlet passageway and forming opposed lips of large surface extending above and below the intersection of said slot with said air inlet passageway, between which lips said air passageway communicates with the space within the battery cell, said water supply passageway being opened to the space within the battery cell below said intersection.

7. A control member for automatically controlling the flow of water from a reservoir to a battery cell, said member being adapted to be supported in a battery cell and formed with water supply and air inlet passageways, said air inlet passageway being intersected by a slot extending out through the side of said member, said slot being bounded by closely separated upper and lower lips, the aperture of said slot at the outer wall of said control member having a considerably greater extent in the direction transverse to the axis of said control member than in the direction parallel to the axis of said control member and being characterized by a portion extending above the highest point of the intersection of said slot with said air passageway, said water supply passageway being opened to the space within said battery cell below said intersection.

8. A control member for automatically controlling the flow of water from a reservoir to a battery cell, said member being adapted to be supported in a battery cell and formed with water supply and air inlet passageways, said member being cut by a slot near its lower end which intersects said air inlet passageway and is bounded by two plane walls sufficiently close together to cause a substantial capillary effect, said slot being inclined so that a portion of it extends above the level of the intersection of the slot with said air passageway, said water supply passageway being opened to the space within said battery cell below said intersection.

9. A control member for automatically controlling the flow of water from a reservoir to a battery cell, said member being adapted to be supported in a battery cell and formed with water supply and air inlet passageways, said member having a single narrow slot near its lower end intersecting said air inlet passageway, said slot being open to the interior of the battery cell on opposite sides of said air inlet passageway and throughout the intervening portion of one side of the circumference of the control member, said slot being slanted so that one end is higher than the other and being bounded by walls sufficiently close together to have a substantial capillary effect, said water supply passageway being opened to the interior of the battery cell below said intersection.

10. A control member for automatically controlling the flow of water from a reservoir to a battery cell, said member being adapted to be supported in a battery cell and formed with water supply and air inlet passageways, and with a slot lying in a plane angular to the vertical axis of the member and having parallel walls sufficiently close together to cause a substantial capillary effect and bounded by the exterior wall of the member in a continuous line, said slot intersecting said air inlet passageway to form a single port therein communicating with the battery interior only through said slot, the water supply passageway having a port below the air passageway port.

THOMAS T. TOWNSEND.